United States Patent
Yasuda (10) Patent No.: US 12,137,679 B2
(45) Date of Patent: Nov. 12, 2024

(54) FISHING INFORMATION MANAGEMENT SYSTEM

(71) Applicant: GLOBERIDE, Inc., Tokyo (JP)

(72) Inventor: Hiromu Yasuda, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 17/182,313

(22) Filed: Feb. 23, 2021

(65) Prior Publication Data

US 2022/0061289 A1  Mar. 3, 2022

(30) Foreign Application Priority Data

Aug. 27, 2020 (JP) ................................. 2020-143239

(51) Int. Cl.
*A01K 97/00* (2006.01)
*G06Q 50/02* (2024.01)

(52) U.S. Cl.
CPC ............. *A01K 97/00* (2013.01); *G06Q 50/02* (2013.01)

(58) Field of Classification Search
CPC ...... A01K 97/125; A01K 97/12; A01K 97/00; A01K 99/00
USPC .......................................................... 43/4, 17
See application file for complete search history.

(56) References Cited

U.S. PATENT DOCUMENTS

| | | | | |
|---|---|---|---|---|
| 3,702,513 A | * | 11/1972 | Watts .................... | A01K 97/125 43/43.12 |
| 4,746,253 A | * | 5/1988 | Simmons ............... | A01K 97/12 43/25 |
| 5,511,335 A | * | 4/1996 | Langer .................. | A01K 97/00 43/17.1 |
| 5,524,831 A | * | 6/1996 | Carlson ................ | A01K 87/007 242/223 |
| 5,546,695 A | * | 8/1996 | Langer .................. | A01K 97/00 87/7 |
| 5,581,930 A | * | 12/1996 | Langer .................. | A01K 97/00 43/17 |

(Continued)

FOREIGN PATENT DOCUMENTS

JP    2006-042607       2/2006
JP    2019187283 A     10/2019

(Continued)

OTHER PUBLICATIONS

European Search Report for related European Application No. 21158171.5; action dated Jul. 27, 2021; (4 pages).

(Continued)

*Primary Examiner* — Darren W Ark
*Assistant Examiner* — Kevin M Dennis
(74) *Attorney, Agent, or Firm* — Oliff PLC (57) ABSTRACT

A fishing information management system has a fishing rod to which a fishing reel with a spool capable of winding a fishing line is attached, and is configured to include an operation/environment information detector that detects information on operation and environment of operation of fishing tools when in use including the fishing reel and the fishing rod, a calculator that calculates hit values related to catching fish from information on the operation of the fishing tools, a storage that stores the detection values and the hit values, and an indicator that displays at least either of the detection values or the hit values.

8 Claims, 6 Drawing Sheets

(56) References Cited

U.S. PATENT DOCUMENTS

| | | | | |
|---|---|---|---|---|
| 5,782,033 | A | * | 7/1998 | Park .................... A01K 97/125 |
| | | | | 43/17 |
| 9,439,411 | B2 | * | 9/2016 | Bailey ................. A61B 5/1123 |
| 9,968,078 | B2 | * | 5/2018 | Worley, III ............. H04L 67/12 |
| 10,223,937 | B2 | * | 3/2019 | Pacchione .............. G09B 5/125 |
| 10,948,577 | B2 | * | 3/2021 | Snyder .................... G01S 15/86 |
| 10,952,421 | B2 | * | 3/2021 | Ikebukuro .............. A01K 97/00 |
| 10,986,825 | B2 | * | 4/2021 | Ikebukuro ........ A01K 89/01931 |
| 2008/0016749 | A1 | * | 1/2008 | Priednieks ......... A01K 89/0108 |
| | | | | 340/573.2 |
| 2014/0358483 | A1 | * | 12/2014 | da Rosa .................... G01D 9/28 |
| | | | | 702/188 |
| 2016/0291918 | A1 | * | 10/2016 | Nagano ................. G06F 3/1446 |
| 2018/0288990 | A1 | * | 10/2018 | Laster .................... A01K 79/02 |
| 2018/0295826 | A1 | | 10/2018 | Blackadar et al. |
| 2018/0295827 | A1 | * | 10/2018 | Blackadar ............ H04W 4/023 |
| 2018/0295828 | A1 | * | 10/2018 | Blackadar ............ G05B 19/042 |
| 2018/0295829 | A1 | * | 10/2018 | Blackadar ................ A63F 13/65 |
| 2018/0338485 | A1 | | 11/2018 | Blackadar et al. |
| 2018/0338486 | A1 | * | 11/2018 | Blackadar ............ H04W 4/023 |
| 2018/0361239 | A1 | | 12/2018 | Blackadar et al. |
| 2020/0140245 | A1 | * | 5/2020 | Yasuda ................. B66C 23/208 |

FOREIGN PATENT DOCUMENTS

| | | |
|---|---|---|
| KR | 2019960035966 U | 12/1996 |
| KR | 10-2002-0048909 A | 6/2002 |
| KR | 102108767 B1 | 5/2020 |
| WO | 2017112778 A1 | 6/2017 |

OTHER PUBLICATIONS

European Office Action for related European Application No. 21158171.5; action dated Aug. 3, 2021; (6 pages).
Chinese Office Action for related Chinese Application No. 202110245454.5; action mailed Sep. 14, 2022; (20 pages).
Office Action for related Korean Application No. 10-2021-0020844; action dated Jan. 19, 2023; (8 pages).
Chinese Rejection Decision in connection with Chinese Patent Application No. 202110245454.5; action mailed on Jul. 25, 2023; (17 pages).
Korean Rejection Decision in connection with Korean Patent Application No. 10-2021-0020844; action mailed on Jul. 6, 2023; (8 pages).
Office Action in connection with European Patent Application No. 21158171.5; action dated Mar. 1, 2023; (7 pages).
Office Action in connection with related Chinese Patent Application No. 202110245454.5; action dated Mar. 11, 2023; (15 pages).
Office Action in connection with related Japanese Patent Application No. 2020-143239; action dated May 30, 2023; (10 pages).
Nov. 27, 2023 Office Action issued in Korean Patent Application No. 10-2021-0020844.
Oct. 17, 2023 Office Action issued in European Patent Application No. 21158171.5.

* cited by examiner

FISHING INFORMATION MANAGEMENT SYSTEM

TECHNICAL FIELD

This disclosure relates to a fishing information management system including a fishing rod to which a fishing reel with a spool capable of winding a fishing line is attached.

BACKGROUND

Generally, when fishing deep-field fish such as in boat fishing, an electric fishing reel ("fishing reel") has been widely used.

Conventionally, that type of fishing reel is provided with a line-length measuring device that measures the length of a wound or unwound fishing line based on the rotation speed of a spool to improve the catch by accurately adjusting the fishing depth, and the values measured by the line-length measuring device appear on an indicator provided on the reel body.

As such a fishing reel, Japanese Patent Application Publication No. 2006-42607 discloses a fishing reel including a spool rotatably supported by the side plates of the reel body therebetween, a winding speed detection means that detects the winding speed during the winding operation of a fishing line wound on the spool, and an indicator that displays the values detected by the winding speed detection means.

However, in the fishing reel disclosed in Japanese Patent Application Publication No. 2006-42607, detection values of winding speed are displayed on an indicator provided on the reel body, but are not intended to be transmitted to the outside of the reel. Further, even if the fishing reel information can be displayed, the fishing reel disclosed in Japanese Patent Application Publication No. 2006-42607 only displays specific information of the reel though there are a variety of fishing information such as a lure, fishing images and a fishing environment. There was, therefore, a problem that the information is extremely limited compared with the information generally desired by fishermen. On the other hand, there was also a problem that providing a variety of fishing information alone is not enough to further improve fishermen's satisfaction with fishing.

It could therefore be helpful to provide a fishing information management system including a fishing rod at which a fishing reel with a spool capable of winding a fishing line is attached, and that can calculate an evaluation related to catching fish from a variety of fishing information.

SUMMARY

I thus provide:

A fishing information management system has a fishing rod to which a fishing reel with a spool capable of winding a fishing line is attached, and is configured to include an operation/environment information detector (operation/environment information detecting unit or operation/environment information detecting portion) that detects information on operation and operation environment of the fishing tools when in use, including the fishing reel and the fishing rod, a calculator (calculating unit or calculating portion) that calculates hit values related to catching fish from information on operation of the fishing tools, a storage (storing unit or storing portion) that stores the detection values and the hit values, and an indicator (indicating unit or indicating portion) that displays at least either of the detection values or the hit values.

The fishing tools may be configured to include the fish reel, the fishing rod, the fishing line, a hook, a weight, an artificial bait, a float, a balance, or a ground bait container.

The operation environment of the fishing tools may be configured to include at least one of the start time of use, the end time of use, the weather condition during use of the fishing tools, or the place of use of the fishing tools.

The operation/environment information detector may be configured to include at least a reel operation information detector (reel operation information detecting unit or reel operation information detecting portion) that detects operation information of the fishing reel, and a fishing rod operation information detector (fishing rod operation information detecting unit or fishing rod operation information detecting portion) that detects the operation information of the fishing rod.

The operation information of a fishing reel may be configured to include at least one of a pulled-out amount of a reel's drag, a pulling-out speed of the reel's drag, a spool rotation start point, a spool rotation end point, a spool diameter, a maximum rotation speed of a spool, a rotation speed history of the spool, a brake setting, a motion of a fishing rod, and backlash information.

The operation information of a fishing rod may be configured to include at least one of the speed, the acceleration, the deformation amount, the motion, and the casing method, of the fishing rod.

Hit values related to catching fish may be configured to be calculated from at least either of a pulled-out amount of a reel's drag and a pulling-out speed of the reel's drag.

Hit values related to catching fish may be configured to be calculated from at least either of the deflection amount and the operation amount of the fishing rod.

It is thus possible to provide a fishing information management system that includes a fishing rod to which a fishing reel with a spool capable of winding a fishing line is attached, and that can calculate an evaluation related to catching fish from a variety of fishing information.

BRIEF DESCRIPTION OF THE DRAWINGS

FIGS. 5(*a*) and 5(*b*) are diagrams illustrating a display example in a fishing information management system according to an example.

DESCRIPTION OF THE NUMERICAL REFERENCES

10 Fishing reel
11 Spool
12 Clutch
13 Drag device
14 Operation portion 15 Braking device
16 Calculator
17 Communication portion
18 Storage
19 Detector
20 Fishing rod
21 Detector
22 Operation/environment information detector
23 Reel operation information detector
24 Fishing rod operation information detector
25 Transmitter (transmitter/receiver)
30 Rig
31 Fishing line
32 Lure (artificial bait)
33 Storage
34 Indicator
35 Float, weight, ground bait container, balance
40 Information processor
100 Fishing information management system

DETAILED DESCRIPTION

Hereinafter, examples will be described in detail with reference to the accompanying drawings. Components common in the plurality of drawings are denoted by the same reference numerals through the plurality of drawings. Each of the drawings is not necessarily scaled for convenience of explanation.

Figure 1:
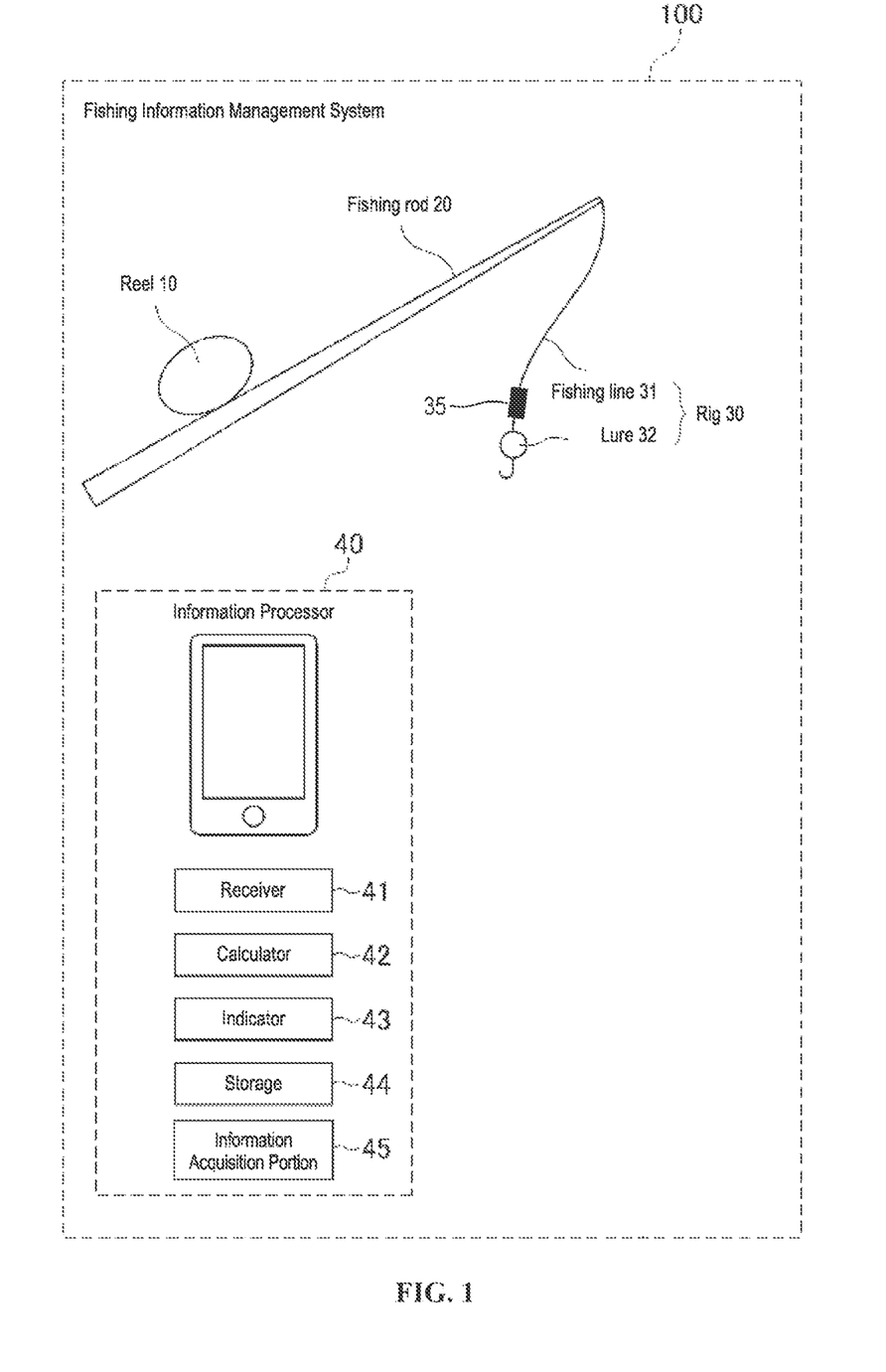
FIG. 1 is a diagram illustrating a fishing information management system according to an example.

First, a basic configuration of a fishing information management system 100 according to an example will be described with reference to FIG. 1. The fishing information management system 100 includes a fishing reel 10 and, like general fishing reels, is configured to wind a fishing line 31 on a spool 11 so that the fishing line 31 can be reeled out from the spool 11, to allow the spool 11 to idle (drag function) so that the set value of the tension can be set when a tension equal to or greater than a set value is applied to the fishing line 31, and to enable the adjustment of braking force for preventing backlash upon casting.

Further, the fishing reel 10 detects, and transmits to an information processor 40, part or all of the above operations. The details will be described later. Like general fishing rods, a fishing rod 20 has the fishing reel 10, and guides the fishing line 31. A user can manipulate the fishing line 31 as necessary by operating the fishing rod 20. The fishing rod 20 detects, and transmits to the information processor 40, the operation of the fishing rod 20. The details will be described later.

Next, a rig 30 is attached to one end of a fishing line 31, and has a hook to be bitten by a fish. In this example, a hook is attached within a lure (artificial bait) 32. Further, various types of rigs are used depending on the targeted fish or fishing method, and a float 35, a weight 35, a ground bait container 35, a balance 35 and the like are used as necessary. An operation detection means such as an acceleration sensor is provided in part of the rig, transmits the operation of the lure 32 to the information processor 40, and is waterproofed and sealed in part of the rig together with a power source, storage means and communication means. The reel 10, the fishing rod 20 and the rig 30 are hereinafter collectively called "tackle".

The information processor 40 accumulates detection results from the respective components constituting the tackle, and calculates hit values related to catching fish. The information processor 40 may be, for example, a portable information terminal (smart phone), a personal computer, a wearable device and a fish-finder. Further, a fishing information processor 10 may be incorporated in a fishing reel 1 or a fishing rod 21 to constitute part thereof. Alternatively, part of the fishing information processor 10 may be incorporated in the fishing reel 1 or the fishing rod 21. Part or all of the information processor 40 may also be located in a server (cloud) on the Internet.

A receiver (receiving unit or receiving portion) 41 can receive detection results from each tackle. Available communication methods are wireless communication, cable communication, ultrasonic communication, and other various known methods. Using this information, a calculator (calculating unit or calculating portion) 42 calculates hit values. Details of the calculation method will be described later. Calculation results are displayed on an indicator (indicating unit or indicating portion) 41 or stored in a storage (storing unit or storing portion) 44. Further, the information processor 40 may include an information acquisition portion (information acquisition unit) 45. The information acquisition portion 45 acquires information on the environment of the fishing place, and is configured to include an environmental information acquisition sensor such as temperature sensor and air pressure sensor, a location sensor such as GPS, a biosensor such as heartbeat sensor, and a camera with which a user can take images. Further, environmental data such as meteorological data (weather, temperature, water depth, tidal circle) of a fishing place may also be acquired through the Internet.

Figure 2:
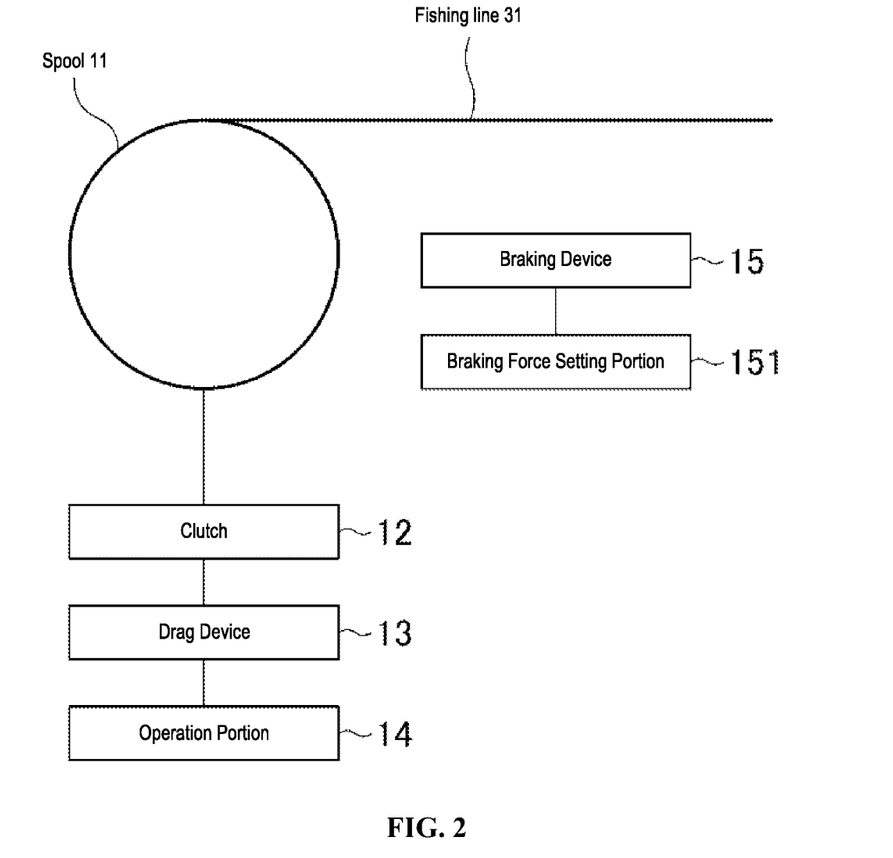
FIG. 2 is a diagram illustrating a fishing reel in a fishing information management system according to an example.

Next, the components of the reel 10 will be described in detail with reference to FIGS. 2 and 3. FIG. 2 shows the basic configuration when using a double-bearing reel as the fishing reel 10. The spool 11 can wind the fishing line 31, and it is possible to wind up the fishing line 31 when the spool is rotated forward by an operation portion (operation unit) 14. A clutch 12 can select the connection/disconnection of the power transmission to the operating portion 14. In the connected state, a winding can be made by the operation portion 14, and in the disconnected state the spool 11 can be freely rotated in the forward and backward directions so that the fishing line 31 can be reeled out. A drag device 13 can idle the spool 11 when a load equal to or greater than the tension set for the fishing line 31 is applied. The operation portion 14 is configured, for example, as a handle and transmits the rotation operation by a user to the spool 11 by a transmission mechanism such as a gear so that the spool 11 can be rotated forward. The operation portion 14 may be a combination of an operation member such as a lever and a power source such as a motor. A braking device 15 can also exert braking force on the spool. This suppresses the occurrence of backlash upon casting. The braking force can be set by a braking force setting portion (braking force setting unit) 151.

Figure 3:
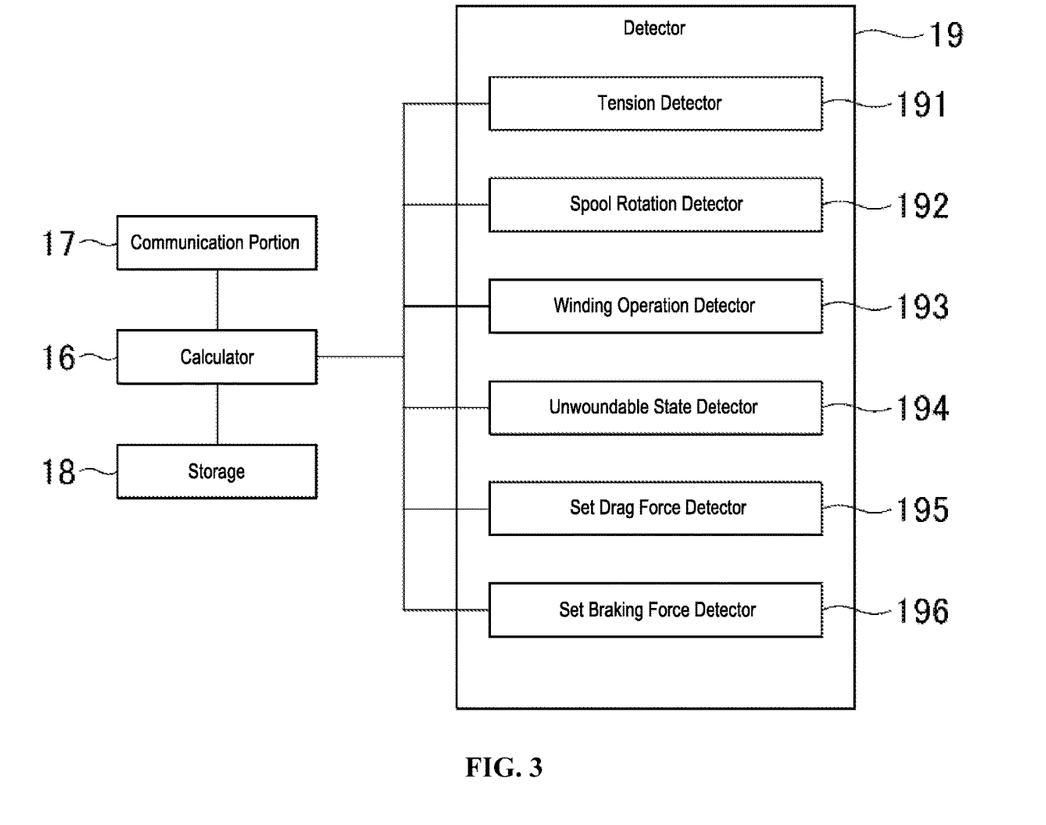
FIG. 3 is a diagram illustrating a fishing reel in a fishing information management system according to an example.

FIG. 3 shows another configuration of the reel 10. The reel 10 has a detector (detecting unit or detecting portion) 19 to detect various operations by a user and the state of the reel. The detection results are sent to a calculator (calculating unit or calculating portion) 16, and are transmitted to the information processor 40 via a communication portion (communication unit) 17 after arithmetic processing or temporary storage in a storage 18 as necessary. The detector 19 includes the following. Some may be omitted due to limitations of costs, sizes and the like. A tension detector (tension detecting unit or tension detecting portion) 191 detects tension acting on the fishing line 31. It can be realized by various known techniques such as detecting by a strain sensor force acting on the rotation axis of the pulley that guides the fishing line 31.

A spool rotation detector (spool rotation detecting unit or spool rotation detecting portion) 192 detects rotation of the spool 11. It can be realized by known means such as an incremental-type rotation sensor using a photo interrupter. A non-contact type rotation sensor is desirable to achieve smooth rotation of the spool 11. A winding operation detector (winding operation detecting unit or winding operation detecting portion) 193 detects rotation of the operation portion 14. It can be realized by attaching a rotation sensor to the operation portion 14, or a gear or the like that rotates in conjunction with the operation portion 14. The amount of idling by the drag device 13 can be calculated by taking the difference between the winding operation detector 193 and the spool rotation detector 192.

An unwoundable state detector (unwoundable state detecting unit or unwoundable state detecting portion) 194 detects whether or not the fishing line 31 can be unwound from the reel 10. The above-described example of the double-bearing reel can be realized by detecting the connection status of the clutch 12. A limit sensor or the like may be attached to part of the member on which the clutch operates. When a spinning-type reel is used as the reel 10, the open/closed state of the veil holding a line guide that guides a fishing line to a spool may be detected.

Further, a set drag force detector 195 detects a set tension that is a threshold at which the spool 11 idles. It can be realized by, for instance, detecting charging force acting on a friction member in a drag device by a pressure sensor. A set braking force detector (set braking force detecting unit or set braking force detecting portion) 196 detects a set value of the braking force for backlash suppression. It can be realized by providing a volume resistance or the like to the braking force setting portion 151. In a type of braking device that sets braking force by computer, the set braking force detector 196 can by realized by obtaining a command value to the braking device.

Figure 4:
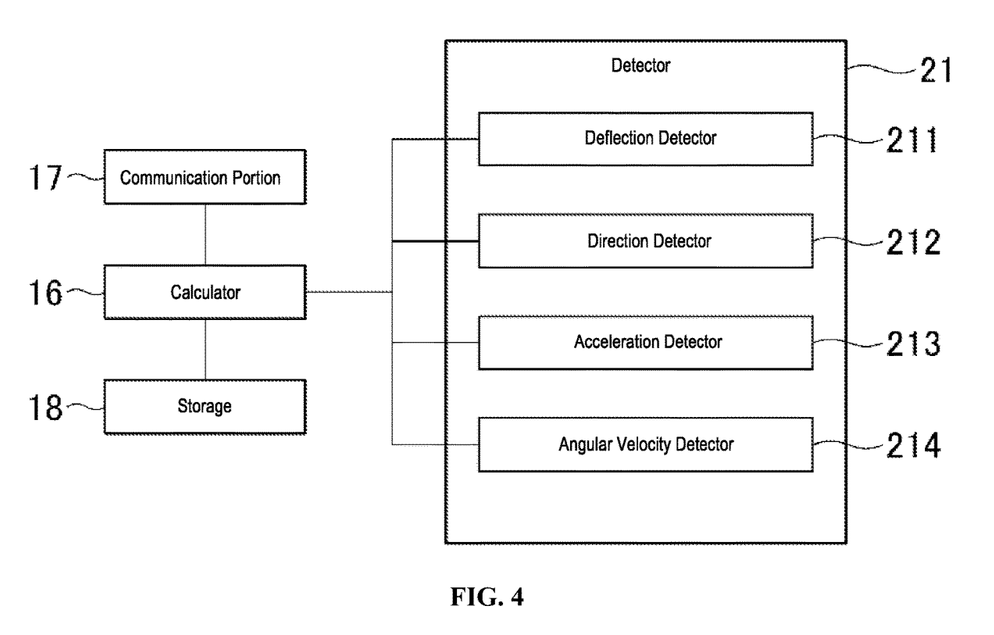
FIG. 4 is a diagram illustrating a fishing rod in a fishing information management system according to an example.

Next, the basic components of the fishing rod 20 will be described in detail with reference to FIG. 4. The fishing rod 20 has a detector 21 that detects various operations by a user and the state of the fishing rod 20. The detection results are sent to the calculator 16 and transmitted to the information processor 40 via the communication portion 17 after arithmetic processing or temporary storage in the storage 18 as necessary. The calculator 16, the communication portion 17, and the storage 18 at this time may be shared with the components of the reel 10 using a wired connection or the like, or may be dedicated to the fishing rod 20, or may be disposed within the reel 10 or on the fishing rod 20.

The detector 21 includes the following. Some may be omitted due to limitations of costs, sizes and the like. A deflection detector (deflection detecting unit or deflection detecting portion) 211 detects deflection (bend) of the fishing rod 20. This can be realized by providing a strain sensor at various portions of the fishing rod 20. Further, the direction detector (direction detecting unit or direction detecting portion) 212 can detect the direction in which the fishing rod 20 is oriented by detecting the geomagnetic direction. Further, the acceleration detector (acceleration detecting unit or acceleration detecting portion) 213 detects the acceleration in the translation direction of the fishing rod 20. It can be realized using a known acceleration sensor such as a piezoresistive method or a capacitance detection method. Further, a speed detector (speed detecting unit or speed detecting portion) 214 detects the angular velocity of the fishing rod 20 (speed in the rotation direction). This can be realized using a known gyro sensor such as a method of detecting a frequency change of the vibrated piezoelectric element.

A sensor called a nine-axis motion sensor that detects the direction, acceleration and angular velocity of each of orthogonal three axes can be used as the direction detector 212, the acceleration detector 213, and a velocity detector (velocity detecting unit or velocity detecting portion) 214. Hereafter, they are called motion sensors. The attitude and the operation of the fishing rod 20 can be obtained by calculating the detection results described above. The motion sensor may be disposed in the reel 10.

An operation/environment information detector 22 in the fishing information management system according to an example is the generic name for the above-mentioned detector 19 in the reel, the detector 21 in the fishing rod, the detector attached to the rig, and the information acquisition portion 45 in the information processor 40.

When a hook is taken by a fish, the following changes often occur to the tackle.

(1) Tension is exerted on a fishing line as a fish swims taking the hook.

(2) The spool is rotated backward by a drag device when tension equal to or greater than the set drag is applied to the fishing line.

(3) The fishing rod bends.

(4) The fishing rod vibrates.

(5) The float sinks (in float fishing).

(6) At least part of the rig (fishing line) vibrates.

These can be detected by the operation/environment information detector 22. The above (1) can be recognized when the tension detector 191 detects that the tension is equal to or greater than a predetermined value, or the amplitude of a predetermined frequency is equal to or greater than a predetermined value. The above (2) can be recognized by detecting that the pulled-out amount or the pulling-out speed of the drag device is equal to or greater than a predetermined value. Further, the above (3) can be recognized by detecting by the deflection detector 211 that the fishing rod bends a predetermined value or more. Further, the above (4) can be recognized by detecting by a motion sensor or the deflection detector 211 a predetermined frequency and amplitude. The above (5) can be recognized by providing a water pressure sensor or an acceleration sensor on the float. The above (6) can be recognized by detecting by the acceleration sensor attached to the rig 30 and the tension detector 191 a predetermined frequency and amplitude.

When a hook is taken by a fish, a user often performs the following operations.

(7) Raising the fishing rod.

(8) Winding the reel.

(9) Taking pictures of a fish caught.

(10) Experiencing changes in biological information such as heartbeat, body temperature, sweating and blood pressure.

These can also be detected by the operation/environment information detector 22. The above (7) can be recognized from the detection results of the motion sensor. The above (8) can be recognized by detecting that the winding operation detector 193 becomes in a predetermined condition. The above (9) can be recognized by detecting whether or not pictures were taken with camera or by detecting by image-recognition technology whether or not a fish is in the image taken. The above (10) can be recognized by a biosensor such as heartbeat sensor attached to a user. Further, an operation button for event recording may be provided on the reel or the fishing rod so that a user may press said button when catching a fish.

Some of these phenomena may occur other than when a fish is caught. For example, some of the above may occur when a hook gets caught on an obstacle such as underwater rock (snagging) or when casting a rig. On the other hand, even when a fish is caught, if the fish is too small, some of the above phenomena may not occur. Therefore, a user can comprehensively judge whether or not a fish is caught by judging each item individually and displaying the list thereof.

Further, a plurality of the items above (1) to (10) evaluated, and calculated as a value, by a calculator 32 in a composite manner increases the value as indices. An example of the comprehensive evaluation is a method of calculating hit values by setting a reliability according to the type of each detector constituting the operation/environment information detector 22, and calculating a weighted average using weights determined according to the reliability.

Another example of the comprehensive evaluation is a method of preparing a large number of training data on fishing in advance and calculating hit values by machine learning such as a neural network. The training data are constituted of the detection results of each detector when a fish is caught and when a fish is not caught, respectively. This method makes it possible to distinguish, with high accuracy, when a fish is caught, when a hook is snagged, and when a fishing line is being cast. In particular, since a combination of a plurality of detection means such as judging from the correlation between the rod operation and the tension change, is effective to distinguish a snagging from a bite, the distinction can be made more accurately than a simple weighted average. On the other hand, the load on the calculator increases with increase in the calculation amount.

Hit values in the example are indicated in percentages depending on the reliability of the result of judging whether a fish is caught. Values of 50% or more are considered to indicate that a fish bites, and the number of fish bites can be estimated by rounding and adding up the values. Further, the sum of hit values for fish caught per unit time (e.g., an hour) can be used as an index of fishability.

Figure 5A:
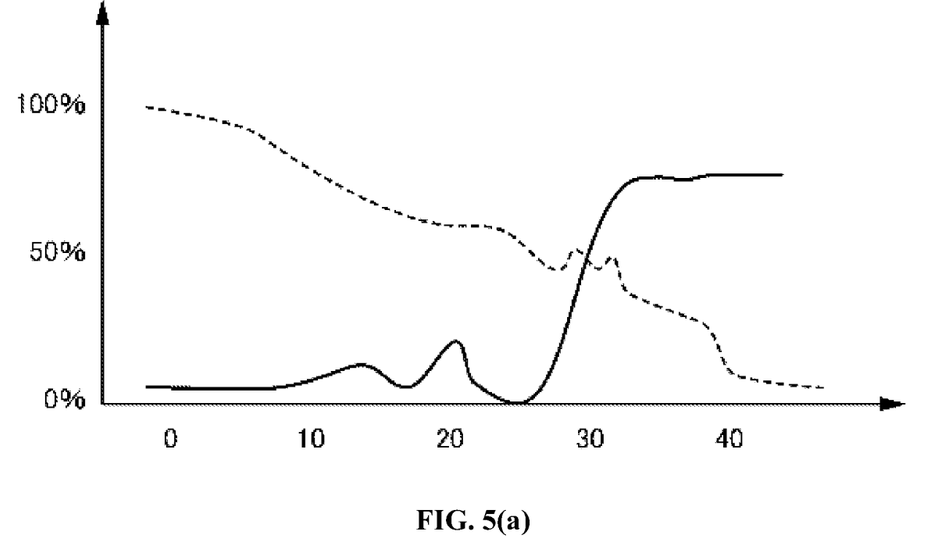
Figure 5B:
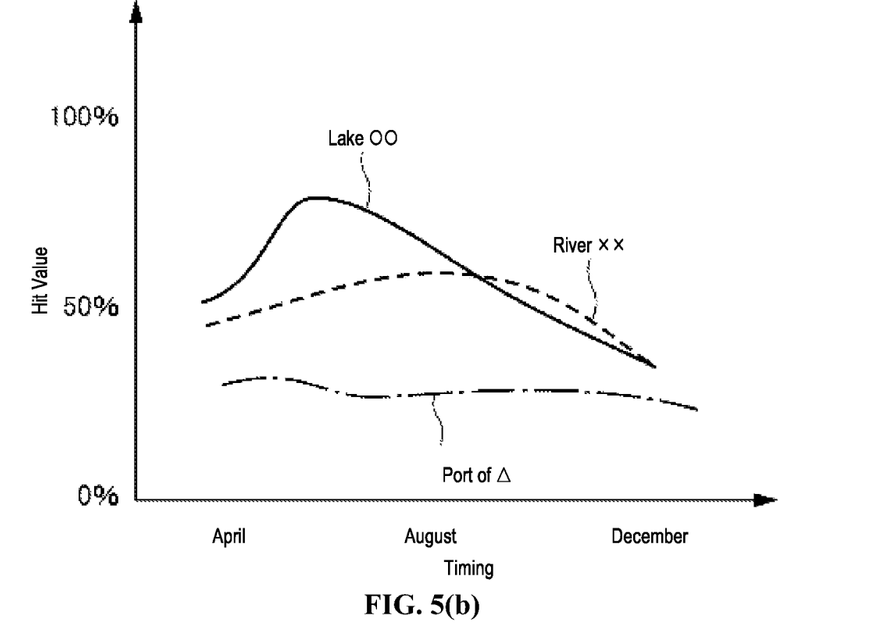

Useful information can be provided to users by displaying the hit values calculated as above on an indicator 34 by the indication method below. FIGS. 5 (a) and 5(b) show examples displaying the time change in the hit values. In FIG. 5(a), the time on the horizontal axis indicates the time in seconds elapsed from the completion of casting. The vertical axis represents hit values. In this example, the timing on when a fish bites can be displayed in one cast of a lure. Further, other information may also be displayed at the same time. For example, if the length of the unwound fishing line is also displayed (indicated by a broken line in the figure), it may be used to specify the place where a fish bites (the depth of water when a rig is dropped down, or the distance when casting in the horizontal direction).

In FIG. 5(b), the horizontal axis indicates the time on a daily or monthly basis, and the vertical axis indicates hit values obtained per unit time. In this example, it is possible to grasp the timing when a fish is caught.

Figure 6:
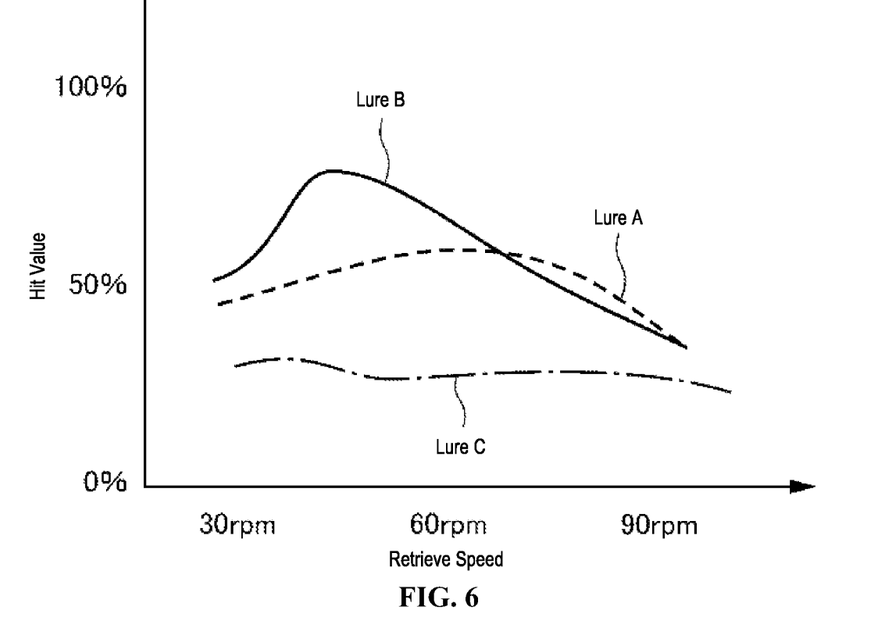
FIG. 6 is a diagram illustrating a display example in a fishing information management system according to an example.

FIG. 6 shows an example indicating the relationship between a user's operation and hit values. FIG. 6 shows the winding speed of a reel on the horizontal axis, and the hit values per unit time of use on the vertical axis. Such a graph is obtained by aggregating use records within a certain period of time (e.g., one month). This example provides the best winding speed for fishing. As in this example, the winding speed in each condition can be obtained by changing the best plot for each use condition (e.g., for each lure). In this manner, it is possible to display users the best operation method to obtain a catch by calculating hit values and indicating the values in connection with the operation of fishing tools.

Figure 7:
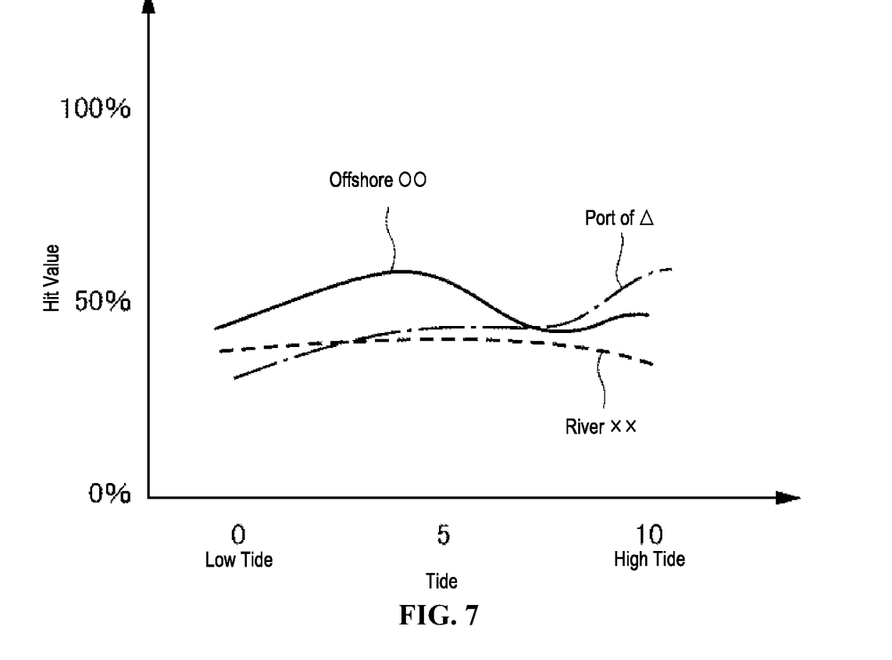
FIG. 7 is a diagram illustrating a display example in a fishing information management system according to an example.

Next, FIG. 7 shows an example indicating the relationship between the fishing environment and hit values. In FIG. 7, the horizontal axis represents the tides (indicated with the difference between the low tide and the high tide divided into 10 equal parts), and the vertical axis represents hit values obtained per unit time. In this example, the best tide conditions for fishing can be obtained. As in this example, the best tide conditions in each fishing spot can be grasped by changing the plot for each fishing spot. The horizontal axis is not limited to the above example, and can include water temperature, air temperature, wind speed, weather, time slot, water depth and the like. Further, the operation condition of fishing tools may be combined with the fishing environment to display the relationship with hit values.

Next, an example of the fishing information management system 100 will be described. The fishing information management system 100 is configured to include the fishing reel 1, the fishing rod 21, and the fishing information processor 10.

More specifically, the fishing information management system 100 has the fishing rod 21 to which the fishing reel 1 with a spool 3 capable of winding a fishing line is attached, and configured to include the operation/environment information detector 22 that detects information on the operation of the fishing tools and the operation environment when the fishing tools including the fishing reel 1 and the fishing rod 21 are used, the calculator 32 that calculates hit values related to catching fish from information on the operation of the fishing tools, a storage 33 that stores the detection values and the hit values, and the indicator 34 that displays at least either of the detection values or the hit values.

The fishing information management system 100 makes it possible to provide a fishing information management system including a fishing rod to which a fishing reel with a spool capable of winding a fishing line is attached, and that can calculate an evaluation related to catching fish from various fishing information.

In the fishing information management system 100, the fishing tools may be configured to include the fishing reel, the fishing rod, the fishing line, a hook, a weight, an artificial bait, a float, a balance, or a ground bait container.

The operation environment of the fishing tools may be configured to include at least one of the start time and the end time for the use of the fishing tools, a weather condition when the fishing tools are used, and a location where the fishing tools are used.

The operation/environment information detector 22 may be configured to include at least a reel operation information detector 23 that detects the operation information of the fishing reel 1, and a fishing rod operation information detector 24 that detects the operation information of the fishing rod 21.

The operation information of the fishing reel 1 may be configured to include at least one of a pulled-out amount or a pulling-out speed of a reel's drag, a spool rotation start point, a spool rotation end point, a spool diameter, a maximum rotation speed of a spool, a rotation speed history of the spool, a brake setting, a motion of a fishing rod, and backlash information.

The operation information of the fishing rod 21 may be configured to include at least one of a speed, an acceleration, a deformation amount, and a motion of, and a method of casting, a fishing rod.

Hit values related to catching fish may be configured to be calculated from at least either of a pulled-out amount or a pulling-out speed of a reel's drag. In this manner, an evaluation related to catching fish can be calculated based on appropriate detection values.

Hit values related to catching fish may be configured to be calculated from at least either of the deflection amount and the operation amount of the fishing rod. In this manner, an evaluation related to catching fish can be calculated based on an appropriate detection value.

The dimensions, materials and arrangements of each component described herein are not limited to those explicitly described in the examples, and each component can be modified to have any dimension, material and arrangement that can be included within the scope of this disclosure. Further, components that are not explicitly described herein may be added to the described examples, or some of the components described in each example may also be omitted.

What is claimed is:

1. A fishing information management system having a fishing rod, a fishing reel with a spool capable of winding a fishing line being attached to the fishing rod, and a rig being attached to an end of the fishing line distal the fishing reel, the fishing information management system comprising:
   an operation and environment information detector configured to detect information on operation of fishing tools and information on operation environment of the fishing tools when in use, including information from the fishing reel, the fishing rod, and the rig;
   a calculator configured to calculate hit values related to catching fish from the information on the operation of the fishing tools, the hit values being a percentage indicating whether a fish bite has occurred;
   a storage configured to store detection values and the hit values; and
   an indicator configured to display at least either of the detection values or the hit values, wherein
   an operation detection device and a communication device are provided inside the rig,
   the operation detection device comprises an acceleration sensor,
   the indicator is configured to display a graph having a first axis representing the hit values and a second axis representing an elapsed time,
   the graph further includes a length of the fishing line, and
   the hit values are calculated based on the detection values
      of a tension applied to the fishing line, an occurrence of backlash of the spool, a deflection or bend of the fishing rod, a vibration of the fishing rod, a sinking of a float attached to the fishing line, a vibration of the fishing line or the rig attached to the fishing line, an occurrence of an operation of raising the fishing rod, and an occurrence of winding the fishing reel.

2. The fishing information management system according to claim 1, wherein the fishing tools include the fishing reel, the fishing rod, the fishing line, a hook, a weight, an artificial bait, the float, a balance, or a ground bait container.

3. The fishing information management system according to claim 1, wherein the operation environment of the fishing tools includes at least one of a start time and an end time for the use of the fishing tools, a weather condition when the fishing tools are used, and a location where the fishing tools are used.

4. The fishing information management system according to claim 1, wherein the operation and environment information detector includes at least a reel operation information detector configured to detect operation information of the fishing reel, and a fishing rod operation information detector configured to detect operation information of the fishing rod.

5. The fishing information management system according to claim 4, wherein the operation information of the fishing reel includes at least one of a pulled-out amount of a reel's drag, a pulling-out speed of a reel's drag, a spool rotation start point, a spool rotation end point, a spool diameter, a maximum rotation speed of the spool, a rotation speed history of the spool, a brake setting, a motion of the fishing rod, and backlash information, the backlash information including the occurrence of the backlash of the spool.

6. The fishing information management system according to claim 4, wherein the operation information of the fishing rod includes at least one of a speed, an acceleration, a deformation amount, and a motion of, and a method of casting, the fishing rod.

7. The fishing information management system according to claim 1, wherein the hit values related to catching fish are also calculated based on at least either of a pulled-out amount or a pulling out speed of a reel's drag.

8. The fishing information management system according to claim 1, wherein the hit values related to catching fish are also calculated based on at least either of an amount of the deflection, or an operation amount, of the fishing rod.

* * * * *